J. D. STOW.
LAMP SUPPORTING AND OPERATING MEANS.
APPLICATION FILED JAN. 20, 1913.
1,076,170.
Patented Oct. 21, 1913.
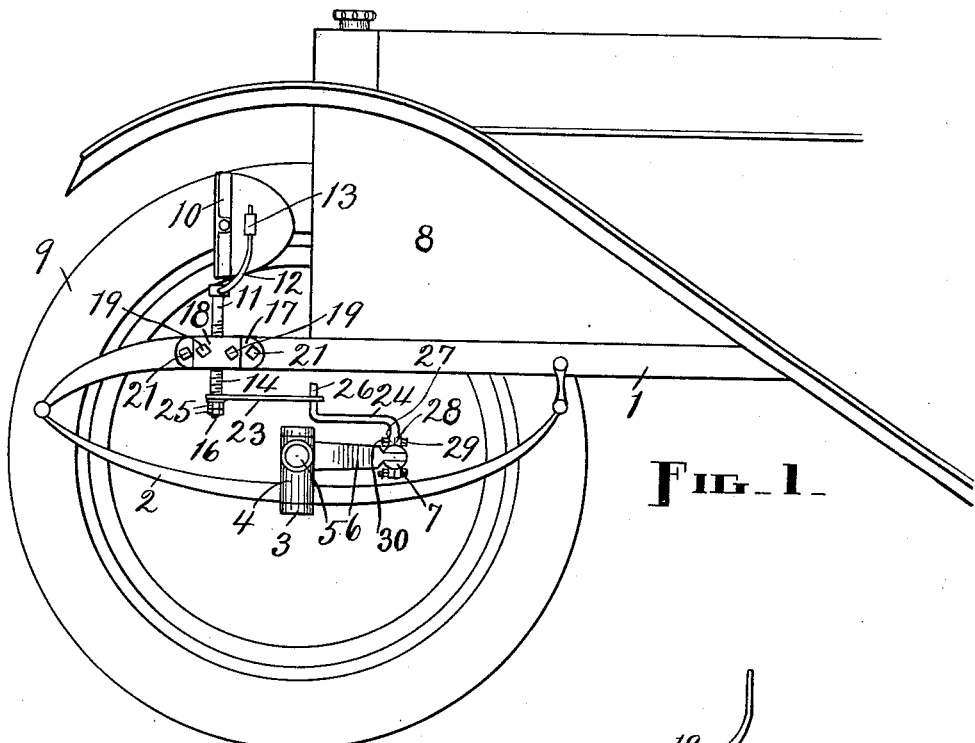
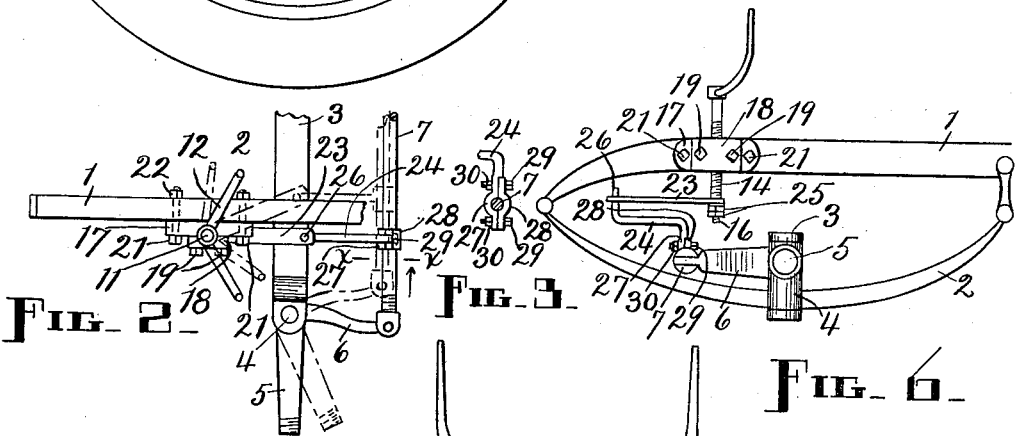
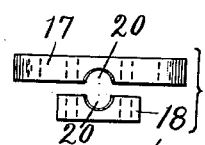
WITNESSES:
A. C. Fairbanks
H. D. Cutter
INVENTOR.
James D. Stow,
BY
Webster & Co.,
ATTORNEYS.

UNITED STATES PATENT OFFICE.

JAMES D. STOW, OF SPRINGFIELD, MASSACHUSETTS.

LAMP SUPPORTING AND OPERATING MEANS.

1,076,170.        Specification of Letters Patent.      Patented Oct. 21, 1913.

Application filed January 20, 1913. Serial No. 743,038.

*To all whom it may concern:*

Be it known that I, JAMES D. STOW, a citizen of the United States of America, residing at Springfield, in the county of Hampden and State of Massachusetts, have invented new and useful Lamp Supporting and Operating Means, of which the following is a specification.

My invention relates to improvement in devices or attachments for automobiles and other power-driven vehicles, for automatically operating or shifting one or more of the lamps or searchlights through the medium of the steering-gear of such a vehicle, to cause the rays of light from such lamps or headlights to follow the track as said steering-gear is manipulated and thus to illuminate the curves and bends of the road as the course of the vehicle changes, and consists of certain peculiar supporting or holding means for a lamp of the above-mentioned type, and of connecting means of special construction between lamp and steering-gear, all as hereinafter set forth.

Heretofore devices or attachments, of the class designated above, have been more or less cumbersome and complicated, difficult to attach, and productive of much annoyance because of their tendency to rattle with almost every movement of the vehicle to which they were applied, and the primary object of my invention is to produce simple means, consisting of few and readily attachable parts, wherewith to connect a lamp with the steering-gear of an automobile or other vehicle in such a manner as to render the operations of the two synchronous, and to overcome or obviate any tendency to rattle.

Other objects will appear in the course of the following description.

I attain these objects by the means illustrated in the accompanying drawings, in which—

Figure 1 is a side elevation of the front part of an automobile equipped with a practical form of my invention; Fig. 2, a top plan of parts of the vehicle, shown in the preceding view, and of the appliance attached thereto, two positions of the operating members being illustrated; Fig. 3, a detail taken on lines *x—x*, looking in the direction of the associated arrow, in Fig. 2; Fig. 4, an enlarged detail plan of the two-part nut or support, which, when in place with the two elements or sections bolted together, constitutes the holder for the lamp-post; Fig. 5, an enlarged front elevation of the lamp-post with the lamp fork at the top, and, Fig. 6, a side elevation of automobile parts, which differ somewhat from corresponding parts in the first two views, and of my device, showing how the latter is applied to the changed construction.

Similar figures refer to similar parts throughout the several views.

In the drawings the application of my invention to two different types of machines is illustrated, and it is to be understood that said invention is applicable to almost any type, an advantage which is one of the important and valuable features thereof. In view of this feature it necessarily follows that considerable latitude must be allowed me in matters of shape, size, construction and arrangement of some or all of the parts of my device, which can be done and yet the scope of my claims not be exceeded.

Ordinarily there are two side lamps at the front of an automobile, and preferably but one of these should be arranged to turn with the steering-gear, the other remaining stationary at all times, because under these conditions the road is illuminated to much better advantage than would be the case if both lamps were arranged to turn with the steering-gear. I have, therefore, shown only one lamp and the appliance therefor. If desired, however, a duplicate appliance may be provided for the second lamp.

In Figs. 1, 2 and 5 of the drawings, I show the forward portion of one side bar of an automobile frame, at 1, a spring at 2, which is attached to said bar, a part of the front vehicle axle at 3, a knuckle at 4 with its wheel axle at 5 and operating arm at 6, such knuckle being pivotally attached in the usual manner to said axle 3, and a part of a tie-rod at 7, the latter being the member that connects said arm with its companion (not shown) and is shifted to the right or left in the act of steering the vehicle. In the first view a portion of the superstructure on the bar 1 and the right-hand front wheel are respectively represented at 8 and 9. These parts and members are all old and well known. In the construction shown in Figs. 1 and 2, the steering arm 6 extends rearwardly from the knuckle 4, while in the Fig. 5 construction such arm extends forwardly from its knuckle.

A lamp 10 appears in Fig. 1. Provided as a direct support for this lamp is a vertical rod or post 11 having at its upper end a fork 12. The lamp 10 has side lugs, one of which is represented at 13, to fit onto the upper terminals of the fork 12. A novel feature distinguishing the lamp-post is a screw-threaded part 14. Below the threaded part 14 the post 11 is faced off to make a prismatic or angular part 15, and depending from such latter part is a screw-threaded part 16. The lamp-post 11 is designed to have its threaded part 14 held in the grasp of a screw-threaded support or holder, which holder preferably consists of two members 17 and 18 fastened together by means of bolts 19—19. Each of the members 17 and 18 has a central, vertical, semi-cylindrical recess 20 in the face thereof which is contiguous to its companion. These recesses 20 are screw-threaded to correspond with the lamp-post screw-threads at 14, and the diameter of the opening which said recesses form, when the members 17 and 18 are brought into contiguity in such a manner that said recesses open into each other, is approximately the same as that of the aforesaid threaded part of the lamp-post. The bolts 19 pass horizontally through the member 18 into threaded engagement with the member 17, a bolt each side of the recesses 20. By making each recess 20 a trifle less than a semi-circle, clearance is left between contiguous faces of the numbers 17 and 18, when the threaded part 14 is in position in said recesses, whereby said threaded part may be gripped with greater or less force accordingly as the bolts 19 are tightened or loosened. The holder, thus formed of the members 17 and 18 and the bolts 19, is secured to any suitable and convenient part of the machine by means best suited for that purpose. In the present case the member 17 is securely attached to the outside of the bar 1 by two bolts 21 and a like number of nuts 22. The bolts 21 pass through the member 17, near the ends thereof, and through the bar 1 to receive the nuts 22 on their inner ends. By thus employing a holder with a threaded socket and a lamp-post having a threaded part to fit such socket, I am able to adjust such post with its lamp vertically, and, what is of far more importance, prevent the lamp-post from rattling in its support. This last is due to the large amount or area of frictionally engaging surfaces afforded by the threaded parts. The degree of frictional resistance between the rotatable lamp-post and its holder may be regulated without difficulty, through the medium of the bolts 19, as already explained, and wear taken up. While it is true that the post 11 in turning rises and falls in the holding members 17 and 18, such vertical movement is so slight, owing to the small amount of rotary motion on the part of said post, which motion is less than one-half of a revolution in any event, as to have no appreciable effect on the light or be objectionable in any way.

The operating means, for the lamp-part 11, comprises a crank arm 23 which is rigidly attached to said post, and an actuating arm 24, for said crank arm, which is rigidly attached to the tie-rod 7 and carried thereby. One end of the arm 23 is fitted to the angular part 15 of the post 11, and nuts 25, on the threaded part 16 of said post, secure said arm in place. The arm 23 extends either forwardly or backwardly accordingly as the arm 6 projects forward or backward. If the arm 23 extends backward from the lamp-post, the arm 24 extends in the same direction from the rear end of said first-mentioned arm, as shown in Figs. 1 and 2; and if said first-mentioned arm extends in the opposite direction from said post, said arm 24 extends rearwardly just the same, but under said arm 23 and from what is then the front end thereof, as shown in Fig. 6. Unless it should occur that the arm 23, which from center to center of its pivotal connections must be equal to the arm 6 from center to center of its pivotal connections, were to extend from the lamp-post 11 to a point directly over the tie-rod 7, when, of course, the arm 24 would extend upward from said tie-rod into direct engagement with said arm 23, said arm 24 is angular in form, substantially as shown, and has at its front end an upstanding part 26 which enters an opening in said arm 23 and constitutes the pivotal connection for said arm 23 at the end opposite that which is attached to said lamp-post. The part 26 should be of sufficient length to admit of all vertical play necessary for the arms 23 and 24, without the former ever coming into contact with the horizontal portion of the latter and so producing a clash or rattle, on the one hand, or ever becoming disconnected from said part, on the other hand. In both examples herewith presented, the arm 24 extends forwardly from the tie-rod 7, but in some constructions said arm would extend rearwardly from said tie-rod. If, when the tie-rod 7 is in neutral position, the lamp 10 is to be positioned with its axis or the axis of its rays at right-angles to the vertical plane of the axle 3, and so maintained, as is the case, the arm 24 must be attached to said rod, while in said neutral position, at a point where said arm and the arm 23 are in the same longitudinal vertical plane, which plane is at right-angles to said axle plane, it being assumed that said arm 23 is parallel with said axis, or that both are in the same vertical plane with each other and with said arm 24 at this time.

Any suitable means may be employed for making a rigid connection between the arm 24 and the tie-rod 7, as, for example, a clamp 27 formed at the base of said arm, a clip 28, two bolts 29 and two nuts 30, best shown in Fig. 3. The bolts 29 and nuts 30 cause the parts to so tightly embrace the tie-rod 7 that no independent motion is permitted, as between said tie-rod and the arm 24.

It is now clear that, if the tie-rod 7 in the first construction be moved to the right, the vehicle is caused to turn to the left, through the medium of the members that directly control the front wheels of said vehicle, and at the same time the lamp-post 11 is turned to the left, and causes the beams of light from the lamp 10 to be directed accordingly. This result is brought about by the arm 24, which moves with the tie-rod 7, and by the arm 32, which is swung by said arm 24 to the right and so partially rotates the post 11, with its fork 12 and lamp 10, in the opposite direction, or to the left, the degree of movement imparted or the angle given to said lamp and its movable supports being the same as the degree of movement imparted or the angle given to the knuckle arm 6 and the wheel axle 5, because of the correspondence in length of said arms 6 and 23 between pivotal points. The disposition of the parts, when the tie-rod is actuated to the right, is indicated by broken lines in Fig. 2, the full lines in this and the other general views showing the arrangement or disposition when the tie-rod is in its intermediate, initial or neutral position, so that the vehicle must travel straight ahead and the lamp throws its rays in the same direction. It is equally clear that, if the tie-rod in the first construction be moved to the left, both the vehicle and the lamp turn to the right, the same causes operating to bring about this double result as when said tie-rod is actuated in the other direction. In either case the arm 24 is carried one way or the other, that is, to the right or left, and forward by and with the tie-rod 7, and takes with it the attached end of the arm 23, and the pivotal connection between said arms moves in exact accord with the pivotal connection between said tie-rod and the arm 6, and describes an arc which is an exact duplicate of that described by said last-mentioned pivotal connection.

In the second or Fig. 6 construction, the direction of the turns of both vehicle and lamp follows the direction of movement of the tie-rod, so that when the latter is actuated to the right the vehicle and lamp are caused to take that direction or to turn in that direction, and when said tie-rod is actuated to the left the vehicle and lamp respond accordingly. Here, too, the tie-rod and attached arm 24 when actuated are moved rearwardly from neutral position, instead of forwardly as was pointed out in connection with such tie-rod and arm in the first construction.

What I claim as my invention, and desire to secure by Letters Patent, is—

1. The combination, in a device of the class described, with a lamp-post having a threaded part, and a holder having a threaded part to receive said first-mentioned threaded part, said lamp-post being arranged and adapted to be oscillated in said holder against the frictional resistance afforded by the engaging threaded parts, of means so to oscillate said post.

2. The combination, in a device of the class described, with a holder, in the form of a threaded socket, adapted to be attached to a vehicle, and comprising separable members and means to secure such members together, and a threaded lamp-post receivable in such socket and adapted to be oscillated therein against the frictional resistance afforded by the engaging threaded parts, of means so to oscillate such post.

JAMES D. STOW.

Witnesses:
F. A. CUTTER,
A. C. FAIRBANKS.

---

Copies of this patent may be obtained for five cents each, by addressing the "Commissioner of Patents, Washington, D. C."